(12) United States Patent
Kim et al.

(10) Patent No.: US 10,904,635 B2
(45) Date of Patent: Jan. 26, 2021

(54) METHOD AND DEVICE FOR PROVIDING DATA IN MULTIMEDIA SYSTEM

(71) Applicant: Samsung Electronics Co., Ltd., Gyeonggi-do (KR)

(72) Inventors: Jung-Won Kim, Seoul (KR); Soon-Gi Hong, Seoul (KR)

(73) Assignee: Samsung Electronics Co., Ltd

( * ) Notice: Subject to any disclaimer, the term of this patent is extended or adjusted under 35 U.S.C. 154(b) by 161 days.

(21) Appl. No.: 15/773,655

(22) PCT Filed: Nov. 4, 2016

(86) PCT No.: PCT/KR2016/012659
§ 371 (c)(1),
(2) Date: May 4, 2018

(87) PCT Pub. No.: WO2017/078462
PCT Pub. Date: May 11, 2017

(65) Prior Publication Data
US 2018/0324501 A1     Nov. 8, 2018

(30) Foreign Application Priority Data
Nov. 4, 2015    (KR) ........................ 10-2015-0154519

(51) Int. Cl.
*H04L 12/00*     (2006.01)
*H04N 21/647*    (2011.01)
(Continued)

(52) U.S. Cl.
CPC ..... *H04N 21/64738* (2013.01); *H04L 65/607* (2013.01); *H04L 65/80* (2013.01);
(Continued)

(58) Field of Classification Search
CPC .. H04N 7/173; H04N 21/2343; H04N 21/236; H04N 21/238; H04N 21/64738;
(Continued)

(56) References Cited

U.S. PATENT DOCUMENTS 5,680,322 A * 10/1997 Shinoda ................ H04L 1/1812
375/E7.016
5,687,095 A * 11/1997 Haskell ................ H04N 21/236
348/386.1
(Continued)

FOREIGN PATENT DOCUMENTS

CN     103828325     5/2014
CN     104253999     12/2014
(Continued)

OTHER PUBLICATIONS

Yuriy Reznik et al., "Thoughts on Signaling of Quality Information in MPEG-DASH", ISO/IEC JTC1/SC29/WG11, Motion Picture Expert Group, MPEG2013/M30593, Jul. 30, 2013, 4 pages.
(Continued)

*Primary Examiner* — Frantz Coby
(74) *Attorney, Agent, or Firm* — The Farrell Law Firm, P.C.

(57) ABSTRACT

The present disclosure relates to a technology for a sensor network, machine to machine (M2M) communication, machine-type communication (MTC), and the Internet of things (IoT). The present disclosure can be used in intelligent services (such as smart home, smart building, smart city, smart car or connected car, healthcare, digital education, retail business, security, and safety related services) on the basis of the technology. A method for providing data in a multimedia system, presented in one embodiment of the present disclosure, comprises the steps of: receiving a message for requesting information on a segment, detecting image quality, the number of sub-segments, and a reception
(Continued)

rate, which are included in the information on the segment; determining a transmission rate on the basis of the detected image quality, number of sub-segments, and reception rate; and providing the information on the segment at the determined transmission rate.

18 Claims, 6 Drawing Sheets

(51) Int. Cl.
| | | |
|---|---|---|
| | *H04N 7/173* | (2011.01) |
| | *H04N 21/238* | (2011.01) |
| | *H04N 21/236* | (2011.01) |
| | *H04N 21/2343* | (2011.01) |
| | *H04L 29/06* | (2006.01) |

(52) U.S. Cl.
CPC ........... *H04N 7/173* (2013.01); *H04N 21/236* (2013.01); *H04N 21/238* (2013.01); *H04N 21/2343* (2013.01); *H04N 21/64784* (2013.01)

(58) Field of Classification Search
CPC .. H04N 21/64784; H04L 65/607; H04L 65/80
USPC ......................... 709/231, 201, 213, 232, 233
See application file for complete search history.

(56) References Cited

U.S. PATENT DOCUMENTS

| | | | | | |
|---|---|---|---|---|---|
| 6,678,324 | B1* | 1/2004 | Yamauchi | ............ | H04N 19/139 375/240.04 |
| 6,999,432 | B2* | 2/2006 | Zhang | .................. | H04L 1/0001 370/328 |
| 7,620,062 | B2* | 11/2009 | Kobayashi | ............ | H04L 1/0002 370/433 |
| 7,672,603 | B2* | 3/2010 | Yamamoto | ......... | G03G 15/5041 399/49 |
| 8,031,771 | B2* | 10/2011 | Chen | ....................... | H04L 65/80 375/240.1 |
| 8,160,160 | B2* | 4/2012 | Blum | ..................... | H04N 19/85 375/240.29 |
| 8,840,475 | B2* | 9/2014 | Perlman | ............... | H04N 19/146 463/42 |
| 9,155,962 | B2* | 10/2015 | van der Laan | ......... | A63F 13/33 |
| 9,420,232 | B2* | 8/2016 | Abkairov | ................ | H04L 65/60 |
| 2001/0022852 | A1* | 9/2001 | Gicquel | ................ | G06T 7/0002 382/162 |
| 2001/0050692 | A1* | 12/2001 | Suh | .................... | H04N 21/2402 345/670 |
| 2003/0121053 | A1* | 6/2003 | Honda | ..................... | H04L 1/24 725/107 |
| 2005/0024532 | A1* | 2/2005 | Choi | ........................ | G06T 3/40 348/441 |
| 2005/0094646 | A1* | 5/2005 | Lee | .................... | H04L 65/1083 370/395.52 |
| 2005/0210515 | A1* | 9/2005 | Roh | ................... | H04N 21/2343 725/81 |
| 2006/0087990 | A1 | 4/2006 | Kakivaya et al. | | |
| 2006/0106961 | A1 | 5/2006 | Ebata et al. | | |
| 2007/0147498 | A1* | 6/2007 | Tanaka | ................ | H04N 19/115 375/240.03 |
| 2008/0232469 | A1* | 9/2008 | Nie | ....................... | H04N 19/154 375/240.12 |
| 2009/0089447 | A1 | 4/2009 | Balachandran et al. | | |
| 2009/0295988 | A1* | 12/2009 | Kohno | ............... | H04N 21/4424 348/441 |
| 2009/0313676 | A1 | 12/2009 | Takeshima et al. | | |
| 2011/0093617 | A1 | 4/2011 | Igarashi | | |
| 2011/0158552 | A1* | 6/2011 | Arai | ....................... | G09G 3/003 382/270 |
| 2012/0257114 | A1* | 10/2012 | Eguchi | ................. | H04N 21/816 348/659 |
| 2013/0042015 | A1 | 2/2013 | Begen et al. | | |
| 2013/0070839 | A1 | 3/2013 | Magee | | |
| 2013/0227122 | A1 | 8/2013 | Gao et al. | | |
| 2014/0013376 | A1 | 1/2014 | Xu et al. | | |
| 2014/0019593 | A1 | 1/2014 | Reznik et al. | | |
| 2014/0025830 | A1 | 1/2014 | Grinshpun et al. | | |
| 2015/0026358 | A1 | 1/2015 | Zhang et al. | | |
| 2015/0172344 | A1 | 6/2015 | Bae | | |
| 2015/0200992 | A1 | 7/2015 | Houdaille et al. | | |
| 2015/0304734 | A1 | 10/2015 | De Vleeschauwer et al. | | |
| 2015/0341404 | A1 | 11/2015 | Xiong et al. | | |
| 2015/0371374 | A1* | 12/2015 | Zeng | ......................... | G06T 5/40 382/171 |
| 2016/0037230 | A1* | 2/2016 | van der Laan | ......... | A63F 13/48 463/31 |
| 2016/0050241 | A1 | 2/2016 | Lotfallah et al. | | |
| 2016/0234282 | A1 | 8/2016 | Lederer et al. | | |
| 2016/0323547 | A1* | 11/2016 | Abkairov | ................ | H04L 67/04 |

FOREIGN PATENT DOCUMENTS

| | | | |
|---|---|---|---|
| CN | 104471955 | 3/2015 | |
| CN | 104780199 | 7/2015 | |
| CN | 104813638 | 7/2015 | |
| CN | 104854839 | 8/2015 | |
| CN | 104509060 | 1/2018 | |
| EP | 1233622 A2 * | 8/2002 | ..... H04N 21/234354 |
| JP | 2006174417 | 6/2006 | |
| KR | 1020080102144 | 11/2008 | |
| KR | 1020140098659 | 8/2014 | |
| WO | WO 2015/022434 | 2/2015 | |

OTHER PUBLICATIONS

Ali El Essaili et al., "QoE-Based Traffic and Resource Management for Adaptive HTTP Video Delivery in LTE", IEEE Transactions on Circuits and Systems for Video Technology, vol. 25, No. 6, Jun. 1, 2015, 14 pages.
European Search Report dated Sep. 27, 2018 issued in counterpart application No. 16862478.1-1209, 8 pages.
PCT/ISA/210 Search Report issued on PCT/KR2016/012659 (pp. 4).
PCT/ISA/237 Written Opinion issued on PCT/KR2016/012659 (pp. 6).
Chinese Office Action dated Apr. 27, 2020 issued in counterpart application No. 201680064530.X, 19 pages.

* cited by examiner

METHOD AND DEVICE FOR PROVIDING DATA IN MULTIMEDIA SYSTEM

PRIORITY

This application is a National Phase Entry of International Application No. PCT/KR2016/012659, which was filed on Nov. 4, 2016, and claims priority to Korean Patent Application No. 10-2015-0154519, which was filed on Nov. 4, 2015, the contents of each of which are incorporated herein by reference.

TECHNICAL FIELD

The present disclosure relates to a method and an apparatus for providing data in a multimedia system, and more particularly to a method and an apparatus for adaptively providing media data in a multimedia system.

BACKGROUND ART

The Internet has evolved from a human-oriented connection network in which humans generate and consume information into the Internet of Things (IoT), in which distributed components such as objects exchange and process information. Internet of Everything technology is an example of a combination of the IoT technology and big-data processing technology, achieved through connection with a cloud server.

In order to implement the IoT, technical factors such as a sensing technique, wired/wireless communication and network infrastructure, service interface technology, and security technology are required, and thus research is being conducted on technologies such as a sensor network, Machine-to-Machine (M2M) communication, Machine-Type Communication (MTC), and the like for a connection between objects.

In an IoT environment, through collection and analysis of data generated between connected objects, an Internet Technology (IT) service to create new value for people's lives may be provided. The IoT may be applied to fields such as a smart home, smart building, smart city, smart car, connected car, smart grid, health care, smart home appliance, or high-tech medical service through the convergence of the conventional Information Technology (IT) and various industries.

Recently, for streaming through a network in a multimedia system, an adaptive streaming scheme is widely used. The streaming scheme repeats a process in which a client device makes a request for media data to a server in real time, receives the requested data, determines a network reception rate, and determines the bit rate of media data to be received next. In the streaming scheme, the client device should continuously make, to the server, a request for media data to be subsequently received.

Accordingly, in a multimedia system, a streaming acceleration device that receives, in advance, information on media data to be transmitted from the server to the client device is used. The conventional streaming acceleration device preloads information on media data to be subsequently transmitted from the server to the client device through idle network resources and then provides the preloaded information on the media data to the client when there is a request from the client device. At this time, the client device determines that the current network reception rate is the transmission rate of the streaming acceleration device that received the information on the media data.

However, when the transmission rate of the streaming acceleration device is higher than the current network reception rate, the client device makes a request for information on subsequent media data at a bit rate higher than the current network reception rate (that is, the transmission rate of the streaming acceleration device), so that buffering for reception of the information on the media data is performed. Further, when the client device makes a request for the information on the media data at a frequently changing bit rate, the information on the media data preloaded by the streaming acceleration device may be deleted.

Accordingly, when the streaming scheme is used in the multimedia system, a method of adaptively providing information on media data to the client device is required.

DETAILED DESCRIPTION OF THE INVENTION

Technical Problem

An embodiment of the present disclosure provides a method and an apparatus for providing data in a multimedia system.

An embodiment of the present disclosure provides a method and an apparatus for adaptively providing media data to a client device in a multimedia system.

An embodiment of the present disclosure provides a method and an apparatus for providing media data to a client device based on a network reception rate in a multimedia system.

Technical Solution

In accordance with a method of providing data in a multimedia system, the method proposed by an embodiment of the present disclosure includes: receiving a message for making a request for information on a segment; detecting an image quality included in the information on the segment, a number of subsegments, and a reception rate; determining a transmission rate based on the detected image quality, number of subsegments, and reception rate; and providing the information on the segment at the determined transmission rate.

In accordance with an apparatus for providing data in a multimedia system, the apparatus proposed by an embodiment of the present disclosure includes: a transceiver configured to transmit and receive data; a receiver that receives a message for making a request for information on a segment; and a controller that performs control to detect an image quality included in the information on the segment, a number of subsegments, and a reception rate, determine a transmission rate based on the detected image quality, number of subsegments, and reception rate, and provide the information on the segment at the determined transmission rate.

Other aspects, gains, and core features of the present disclosure are processed along with additional drawings, and they are apparent to those skilled in the art from the following detailed description including exemplary embodiments of the present disclosure.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular processor may be centralized or distributed, whether locally or remotely. Definitions for certain words and phrases are provided throughout this patent document, those skilled in the art should understand that in many, if not most instances, such definitions apply to prior, as well as future uses of such defined words and phrases.

BRIEF DESCRIPTION OF DRAWINGS

The above and other aspects, features and advantages of the present disclosure will be more apparent from the following detailed description taken in conjunction with the accompanying drawings, in which.

It should be noted that similar reference numerals are used to indicate identical or similar elements, features, and structures through the above figures.

MODE FOR CARRYING OUT THE INVENTION

Figure 1:
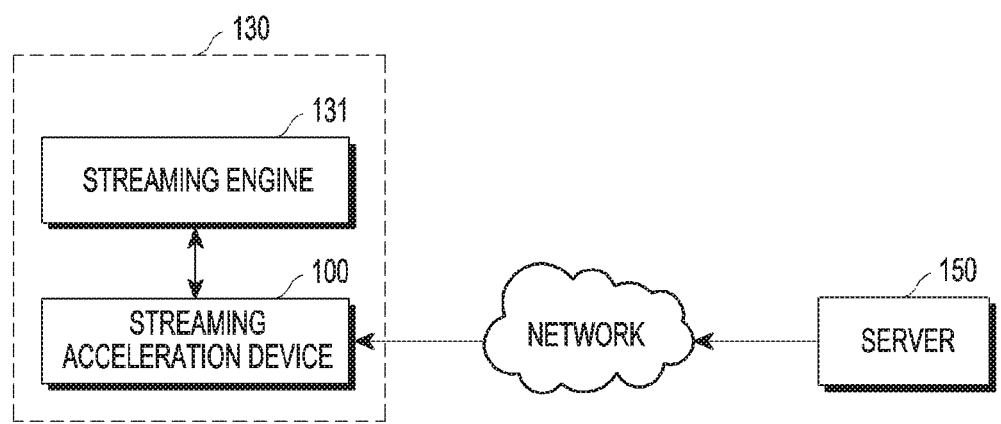
FIG. 1 illustrates an example of a multimedia system to which an embodiment of the present disclosure is applied.

The following detailed described that refers to the accompanying drawings help in comprehensively understanding various embodiments of the present disclosure defined by the claims and the equivalents thereof. Although the following detailed description includes various specific concrete explanations to assist with understanding, they are considered to be only examples. Accordingly, those skilled in the art may recognize that various modifications and changes of the various embodiments described herein can be made without departing from the range and scope of the present disclosure. Further, descriptions of the known functions and elements can be omitted for clarity and brevity.

The terms and words used in the following detailed description and the claims are not limited to literal meanings, and are simply used for helping obtain a clear and consistent understanding of the present disclosure of the disclosure. Therefore, it should be apparent to those skilled in the art that the following description of various embodiments of the present disclosure is provided for illustrative purposes only, and is not intended to limit the present disclosure that is defined by the appended claims and equivalents thereof.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as commonly understood by those of skill in the art to which the present disclosure pertains. Such terms as those defined in a generally used dictionary are to be interpreted to have the meaning equal to the contextual meaning in the relevant field of art.

FIG. 1 illustrates an example of a multimedia system to which an embodiment of the present disclosure is applied.

Referring to FIG. 1, the multimedia system includes a streaming engine 131, a streaming acceleration device 100, and a server 150. Here, although it is illustrated that the streaming acceleration device 100 is included in a client device 130, the streaming acceleration device 100 may be connected to the client device 130 and the server 150 in a wired or wireless manner outside of the client device 130 according to implementation.

The streaming engine 131 is a device that provides media data to a display unit (not shown) of the client device 130 and makes a request for information on the media data to be provided to the display unit to the streaming acceleration device 100.

The streaming acceleration device 100 may be, for example, a proxy server, and preloads information on subsequent media data to be provided after the information on the media data provided to the streaming engine 131. When the streaming acceleration device 100 receives a request for information on media data from the streaming engine 131, the streaming acceleration device 100 configures the transmission rate at which the request for the information on the media data made to the streaming engine 131 is transmitted based on a network reception rate and the information on the requested media data. The streaming acceleration device 100 transmits the information on the requested media data to the streaming engine 131 based on the configured transmission rate. Here, the method by which the streaming acceleration device 100 configures the transmission rate will be described below in detail with reference to FIG. 4.

The server 150 is a media server that transmits information on media data to the streaming acceleration device 100 according to the request from the streaming acceleration device 100.

The media data is one segment included in one scene, and the one segment may be transmitted and received in parallel through a plurality of paths. Accordingly, hereinafter, the media data is defined and described as a segment, and the segment will be defined and described to be configured by at least one subsegment.

Figure 2:
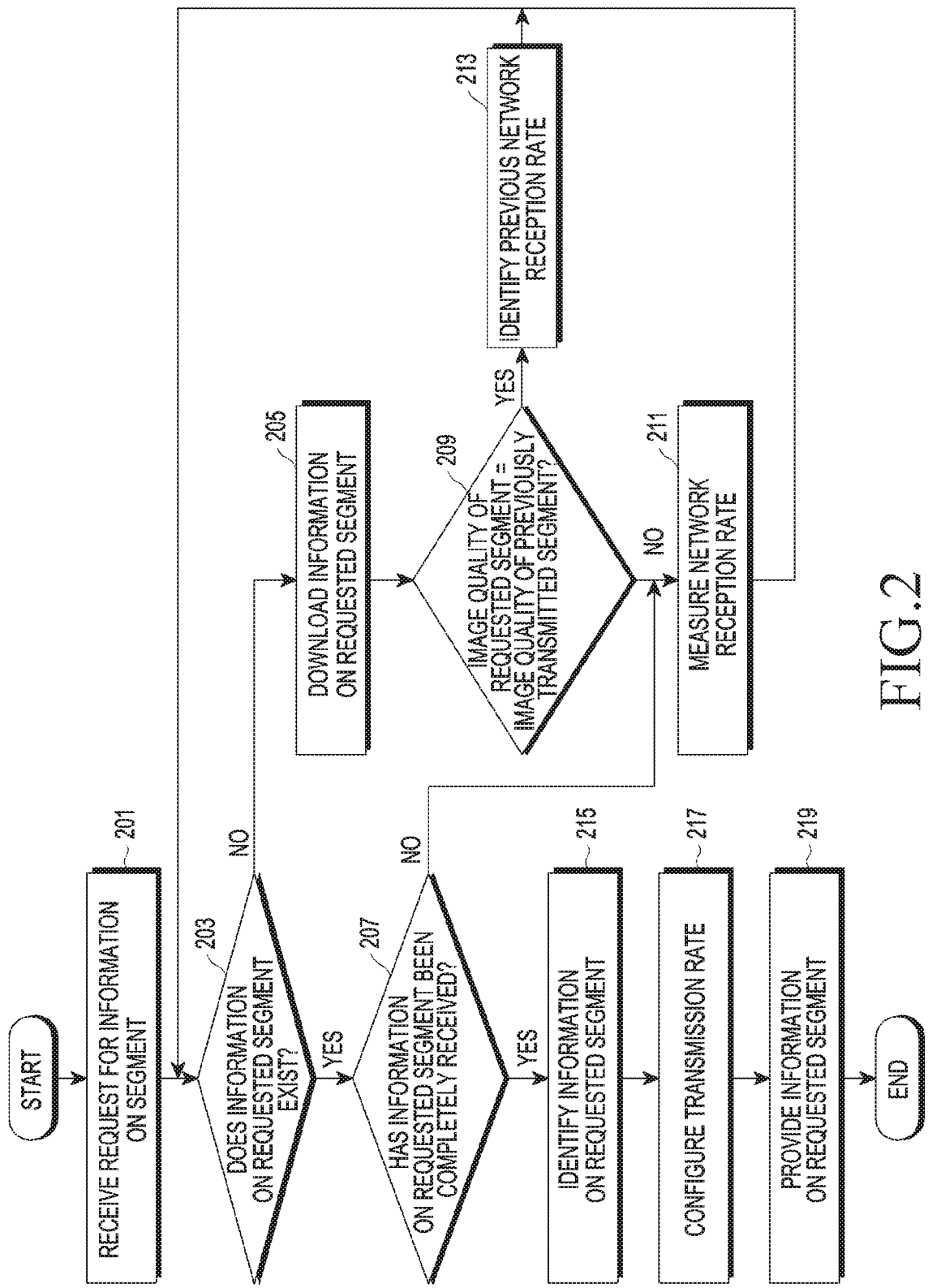
FIG. 2 illustrates a method by which a streaming acceleration device 100 of a multimedia system provides data according to an embodiment of the present disclosure.

FIG. 2 illustrates the method by which the streaming acceleration device 100 of the multimedia system according to an embodiment of the present disclosure provides data.

Referring to FIG. 2, the streaming acceleration device 100 receives a request for information on a segment from the streaming engine 131 included in the client device 130 in step 201.

Then, the streaming acceleration device 100 determines whether information on at least one sub segment included in the information on the requested segment exists in a storage unit in step 203. If the storage unit includes information on at least one subsegment, the streaming acceleration device 100 identifies whether information on all subsegments for configuring the information on the requested segment exists in the storage unit and determines whether the information on the requested segment has been completely received in step 207. Since the streaming acceleration device 100 is already aware of the total size of the information on the requested segment, the streaming acceleration device 100 may determine whether the information on the requested segment has been completely received by comparing the total size of the information on the requested segment with the information on the subsegment stored in the storage unit.

When the information on the segment has been completely received, the streaming acceleration device 100 identifies the information on the requested segment in step 215. The information on the segment includes at least one piece of information among information on indexes of subsegments included in the segment and an image quality, information on a reception rate at which the information on the segment is received, information on a number of subsegments, information on the size of the information on the segment, information on the size of the subsegments, information on a time at which the information on the segment is received, information on a time at which each of the subsegments is received, and information on a location at which the segment exists.

In contrast, when the information on the requested segment has not been completely received, the streaming acceleration device 100 measures a network reception rate based on the received information on at least one subsegment in step 213. For example, the streaming acceleration device 100 may measure the network reception rate based on Equation (1) below.

Network reception rate=segment size/segment reception time  <Equation 1>

Equation (1) above will be described below in detail with reference to FIG. 3.

Figure 3:
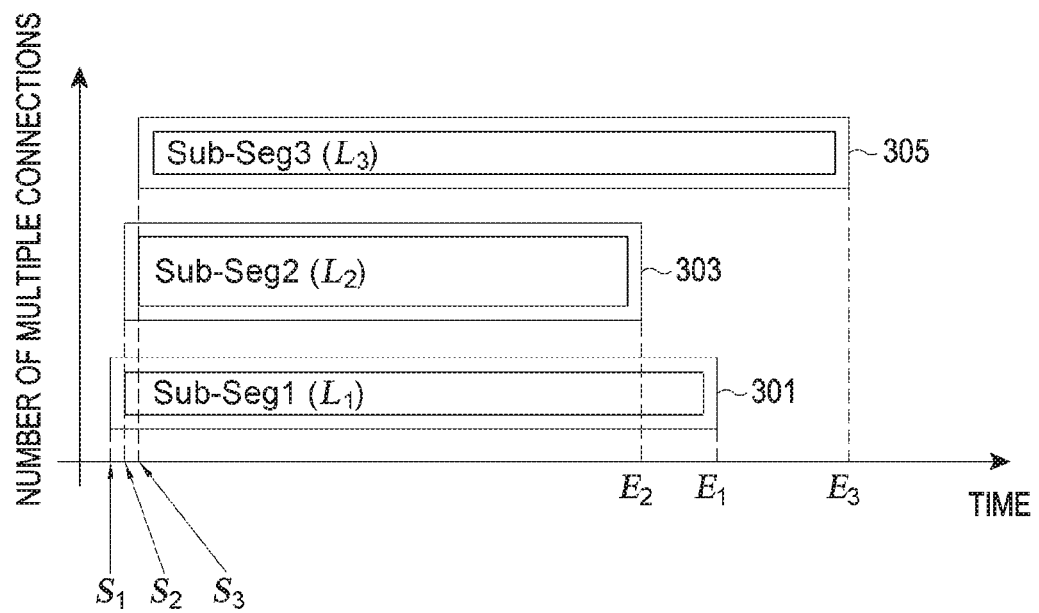
FIG. 3 illustrates an example in which the streaming acceleration device 100 receives subsegments according to an embodiment of the present disclosure.

FIG. 3 illustrates an example in which the streaming acceleration device 100 receives subsegments according to an embodiment of the present disclosure, in which one segment consists of 3 subsegments 301 to 305.

In FIG. 3, it is assumed that a first subsegment 301 has a length of $L_1$, a second subsegment 303 has a length of $L_2$, and a third subsegment 305 has a length of $L_3$. Also, it is assumed that the streaming acceleration device 100 receives, from the server 150, the first subsegment 301 during time from $S_1$ to $E_1$, the second subsegment 303 during time from $S_2$ to $E_2$, and the third subsegment 305 during time from $S_3$ to $E_3$. In this case, the streaming acceleration device 100 may measure a network reception rate through Equation (2) below based on Equation (1) above.

Segment size/segment reception time=$(L_1+L_2+L_3)/(E_3-S_1)$  <Equation 2>

Next, the streaming acceleration device 100 configures a transmission rate that is used when the information on the requested segment is transmitted to the streaming engine 131 based on the information on the requested segment in step 217. Here, the method by which the streaming acceleration device 100 configures the transmission rate will be described below in detail with reference to FIG. 4.

The streaming acceleration device 100 provides the information on the requested segment to the streaming engine 131 at the configured transmission rate in step 219. The streaming acceleration device 100 may provide the streaming engine 131 with only the information on the requested segment or with both the configured transmission rate and the information on the requested segment, or may record the configured transmission rate in a part of the information on the requested segment and then transmit it.

Meanwhile, when at least one subsegment for configuring the requested segment does not exist in the storage unit, the streaming acceleration device 100 downloads the information on the requested segment from the server 150 in step 205. Further, the streaming acceleration device 100 identifies whether an image quality included in the downloaded information on the segment has the same bit rate as that of an image quality included in the information on the segment previously provided by the streaming acceleration device 100 in step 209. If the image quality included in the downloaded information on the segment has the same bit rate as that of the image quality included in the previously provided information on the segment, the network reception rate is not measured again, but the previously measured network reception rate is reused in step 213. In contrast, when the image quality included in the downloaded segment has a different bit rate from that of the previously provided segment, the network reception rate is measured based on Equation (1) above in step 211. Further, when the network reception rate has been completely measured, the streaming acceleration device 100 proceeds to step 203.

In addition, after completely providing the information on the requested segment to the client device 130, the streaming acceleration device 100 may download information on the next segment of the requested segment from the server 150, measure in advance the network reception rate of the information on the downloaded segment, and store the measured network reception rate in the storage unit.

Figure 4:
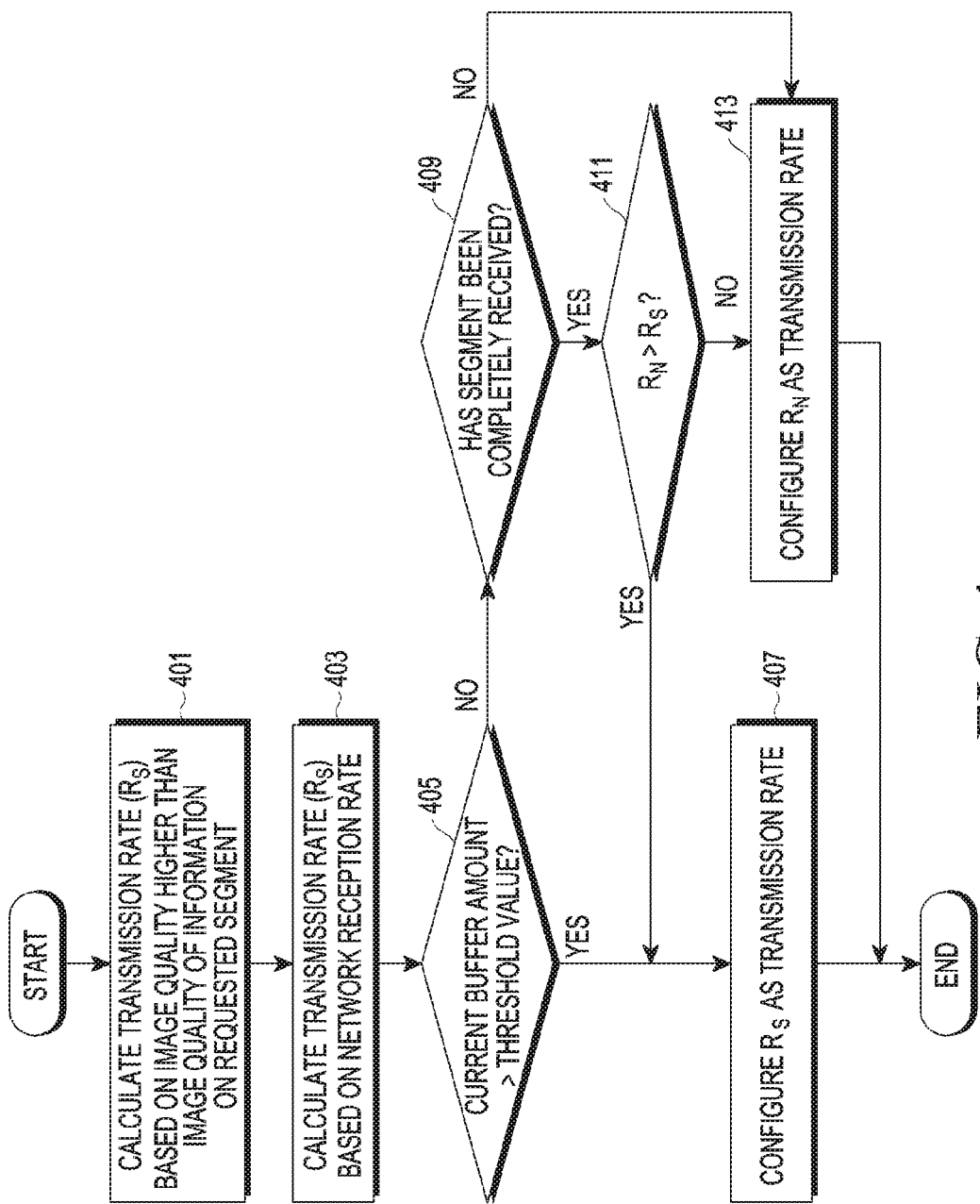
FIG. 4 illustrates a method by which the streaming acceleration device 100 determines a transmission rate according to an embodiment of the present disclosure.

FIG. 4 illustrates a method by which the streaming acceleration device 100 determines a transmission rate according to an embodiment of the present disclosure.

Referring to FIG. 4, the streaming acceleration device 100 identifies an image quality included in information on the requested segment and calculates a transmission rate ($R_S$) based on a higher image quality having a bit rate that is higher than the identified image quality by a predetermined threshold value in step 401. For example, when the image quality of the requested segment is 10 mbps, the streaming acceleration device 100 calculates the transmission rate ($R_S$) based on 15 mbps, which is higher than 10 mbps. Further, the streaming acceleration device 100 calculates a transmission rate ($R_N$) based on the network reception rate included in the information on the requested segment in step 403.

Next, the streaming acceleration device 100 determines whether a buffering amount of the information on the segment stored in the storage unit is larger than the predetermined threshold value in step 405. When the buffering amount is larger than the threshold value, the streaming acceleration device 100 determines that the transmission rate is the calculated $R_S$ in step 407. The buffering amount of the storage unit may be proportional to the number (or size) of segments stored in the storage unit of the streaming acceleration device 100, and the threshold value may be determined based on a buffering amount of the client device 130.

When the buffering amount is smaller than the threshold value, the streaming acceleration device 100 identifies again whether the information on the requested segment has been completely received in step 409. When the buffering amount is the same as the threshold value, the streaming acceleration device 100 may proceed to step 407 or step 409, depending on at least one of a network state, a system configuration, and a user selection. If the information on the requested segment has not been completely received, the streaming acceleration device 100 determines that the transmission rate is the calculated $R_N$ in step 413. When the information on the requested segment has been completely received, the streaming acceleration device 100 determines whether the calculated $R_N$ is larger than $R_S$ in step 411. The streaming acceleration device 100 determines that the transmission rate is the calculated $R_S$ in step 407 when the calculated $R_N$ is larger than $R_S$, and determines that the transmission rate is the calculated $R_N$ in step 413 when the calculated $R_N$ is smaller than $R_S$. When the calculated $R_N$ is the same as $R_S$, the transmission rate may be determined as $R_S$ or $R_N$ depending on at least one of a network state, a system configuration, and a user selection.

Figure 5:
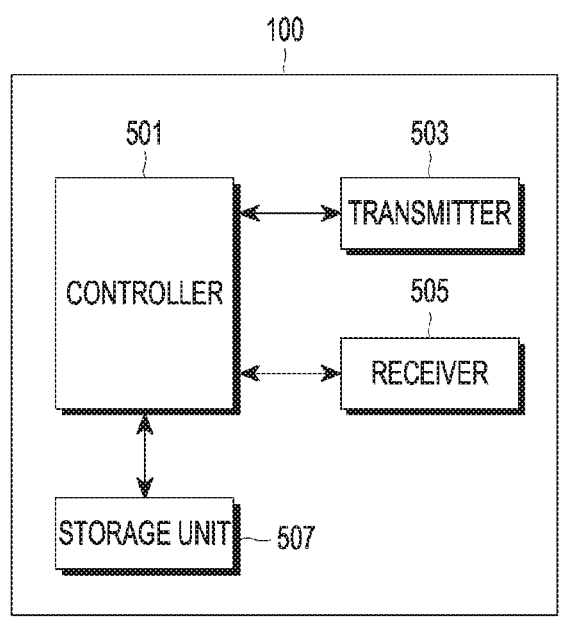
FIG. 5 illustrates an internal configuration of a device that provides information on a segment in the streaming acceleration device 100 of a multimedia system according to an embodiment of the present disclosure.

FIGS. 2 to 4 illustrate the method by which the streaming acceleration device 100 provides information on the segment to the client device 130, and subsequently FIG. 5 illustrates the internal structure of the streaming acceleration device 100 that provides information on the segment in a multimedia system according to an embodiment of the present disclosure.

FIG. 5 illustrates the internal structure of a device that provides information on the segment in the streaming acceleration device 100 of the multimedia system according to an embodiment of the present disclosure.

Referring to FIG. 5, the streaming acceleration device 100 includes a controller 501, a transmitter 503, a receiver 505, and a storage unit 507.

The controller 501 controls the overall operation of the streaming acceleration device 100, especially operations related to the operation of providing information on the segment according to an embodiment of the present disclosure. Since operations related to the operation of providing information on the segment according to an embodiment of the present disclosure are the same as those described in connection with FIGS. 2 to 4, a detailed description thereof will be omitted.

The transmitter 503 receives various signals and various messages from other entities included in the multimedia system under the control of the controller 501. Since the various signals and the various messages received by the transmitter 503 are the same as those described in FIGS. 2 to 4, a detailed description thereof will be omitted herein.

The receiver 505 receives various signals and various messages from other entities included in the multimedia system under the control of the controller 501. Since the various signals and the various messages received by the receiver 505 are the same as those described in FIGS. 2 to 4, a detailed description thereof will be omitted herein.

The storage unit 507 stores programs and various data related to the operation of providing information on the segment according to an embodiment of the present disclosure, which is performed by the streaming acceleration device 100 under the control of the controller 501. Further, the storage unit 507 stores various signals and various messages received from the other entities by the receiver 505.

Meanwhile, although FIG. 5 illustrates the case where the streaming acceleration device 100 is implemented as separate units, such as the controller 501, the transmitter 503, the receiver 505, and the storage unit 507, the streaming acceleration device 100 can be implemented as a single unit in which at least two of the controller 501, the transmitter 503, the receiver 505, and the storage unit 507 are integrated. Further, the streaming acceleration device 100 can be implemented as a single processor.

FIG. 6 illustrates an example of a result obtained by applying the method by which the streaming acceleration device 100 of the multimedia system provides information on the segment according to an embodiment of the present disclosure.

Figure 6A:
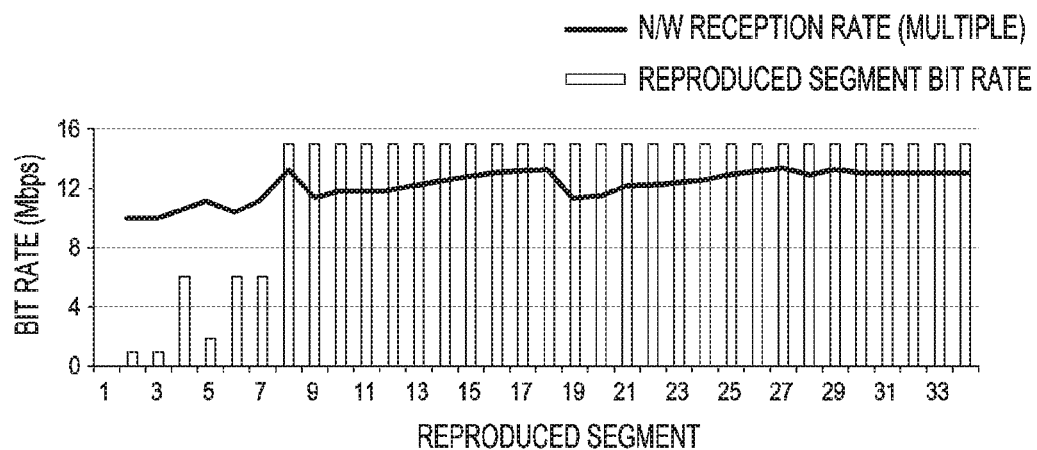
FIG. 6 illustrates an example of a result obtained by applying the method by which the streaming acceleration device 100 of the multimedia system provides the information on the segment according to an embodiment of the present disclosure.

FIG. 6A illustrates a result obtained without application of the method by which the streaming acceleration device 100 of the multimedia system provides information on the segment according to an embodiment of the present disclosure. Referring to FIG. 6A, as the client device 130 makes a request for information on a segment at a bit rate higher than a network reception rate, buffering occurs 11 times.

Figure 6B:
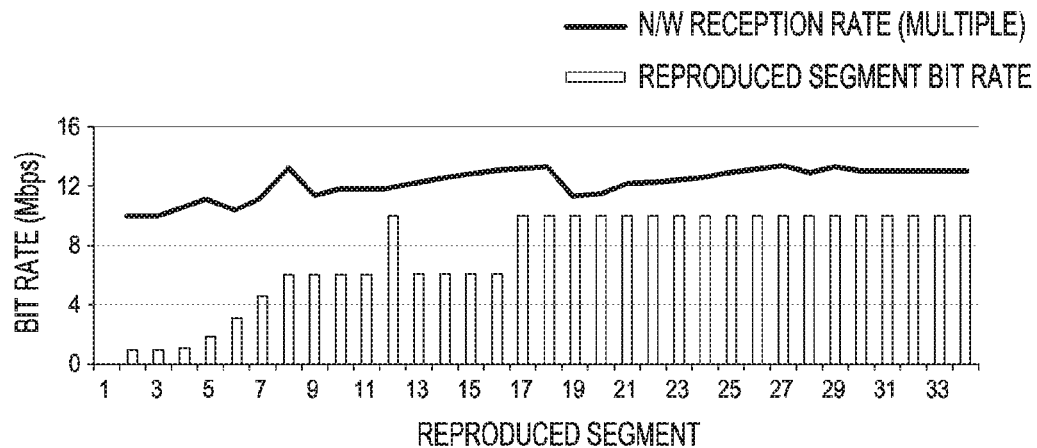
Figure 6C:
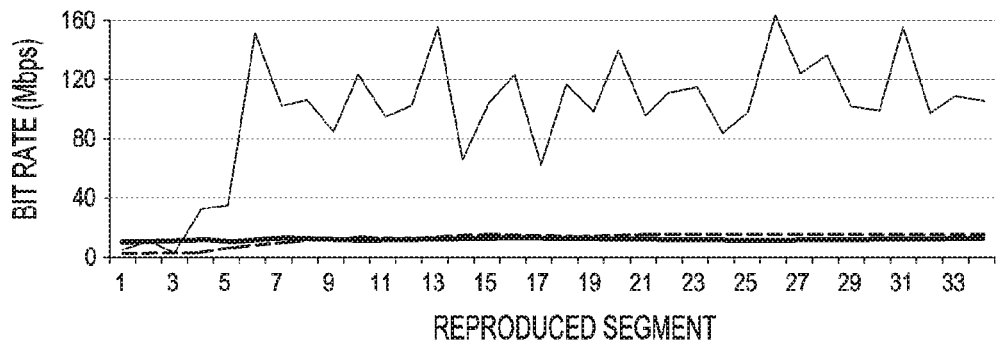

FIG. 6B illustrates a result obtained without application of the method by which the streaming acceleration device 100 of the multimedia system provides information on the segment according to an embodiment of the present disclosure. Referring to FIG. 6B, as the client device 130 makes a request for information on a segment at a bit rate that is similar to that of the network reception rate, no buffering occurs at all. The transmission rate of the streaming acceleration device 100 configured according to an embodiment of the present disclosure may be configured to be almost the same as the network reception rate, as shown in FIG. 6C.

Accordingly, when the method by which the streaming acceleration device 100 of the multimedia system provides information on the segment according to an embodiment of the present disclosure is applied, it is possible to prevent buffering, thereby providing an adaptive streaming service of a stable (that is, improved) quality to the client device 130. Further, when the method by which the streaming acceleration device 100 provides information on the segment according to an embodiment of the present disclosure is applied, it is possible to minimize deletion of preloaded segments, thereby minimizing waste of user communication data by an acceleration function and improving network availability.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

The invention claimed is:

1. A method of providing data in a multimedia system, the method comprising:
   receiving a message for requesting information on a segment;
   detecting an image quality, a number of subsegments, and a reception rate based on the information on the segment;
   determining a transmission rate based on the detected image quality, the number of subsegments, and the reception rate; and
   providing, at the determined transmission rate, the information on the segment,
   wherein determining the transmission rate comprises:
   calculating a first transmission rate based on a higher image quality having a bit rate higher than the image quality by a first threshold value;
   calculating a second transmission rate based on the reception rate; and
   determining a final transmission rate among the first transmission rate and the second transmission rate, based on a comparison relationship between an amount of information on a segment stored in a buffer and a second threshold value.

2. The method of claim 1, wherein the reception rate is determined based on an inverse relationship between the number of subsegments included in the information on the segment and a time period at which the subsegments are received.

3. The method of claim 1, wherein, when the image quality is equal to an image quality included in information on a previously provided segment, the reception rate is determined as a reception rate equal to that included in the information on the previously provided segment.

4. The method of claim 1, further comprising, when the information on the segment is not stored in advance, downloading the information on the segment from a server.

5. The method of claim 1, wherein the information on the segment contains at least one piece of information among information on indexes and image qualities of subsegments included in the segment, information on a reception rate at which the information on the segment is received, information on a number of subsegments, information on a size of the segment, information on sizes of the subsegments, information on a time at which the information on the segment is received, information on a time at which each of the subsegments is received, and information on a location at which the segment exists.

6. The method of claim 1, wherein determining that the first transmission rate or the second transmission rate is the final transmission rate comprises:
   based on a result of the comparison between the amount of the information on the segment stored in the buffer and the second threshold value, when the amount of the information on the segment stored in the buffer is larger than the second threshold value, determining that the first transmission rate is the final transmission rate; and
   when the amount of the information on the segment stored in the buffer is smaller than the second threshold value, determining that the first transmission rate or the second transmission rate is the final transmission rate depending on whether the information on the segment stored in the buffer contains information on all subsegments for configuring the information on the segment stored in the buffer.

7. The method of claim 6, further comprising:
   when the information on the segment stored in the buffer does not contain the information on all the subsegments for configuring the information on the segment stored in the buffer, determining that the second transmission rate is the final transmission rate; and
   when the information on the segment stored in the buffer contains the information on all the subsegments for configuring the information on the segment stored in the buffer, determining that the first transmission rate or the second transmission rate is the final transmission rate depending on the first transmission rate and the second transmission rate.

8. The method of claim 7, wherein determining that the first transmission rate or the second transmission rate is the final transmission rate depending on the sizes of the first transmission rate and the second transmission rate comprises:
   when the second transmission rate is larger than the first transmission rate, determining that the first transmission rate is the final transmission rate; and
   when the second transmission rate is smaller than the first transmission rate, determining that the second transmission rate is the final transmission rate.

9. The method of claim 1, wherein providing the information comprises recording the determined transmission rate in the information on the requested segment.

10. The method of claim 1, further comprising providing the determined transmission rate.

11. An apparatus for providing data in a multimedia system, the apparatus comprising:
    a receiver configured to receive a message for requesting information on a segment; and
    a controller configured to perform control to detect an image quality, a number of subsegments, and a reception rate based on the information on the segment, determine a transmission rate based on the detected image quality, the number of subsegments, and the reception rate, and provide, at the determined transmission rate, the information on the segment,
    wherein the controller is configured to:
    calculate a first transmission rate based on a higher image quality having a bit rate higher than the image quality by a first threshold value;
    calculate a second transmission rate based on the reception rate; and
    determine a final transmission rate among the first transmission rate and the second transmission rate, based on a comparison relationship between an amount of information on a segment stored in a buffer and a second threshold value.

12. The apparatus of claim 11, wherein the reception rate is determined based on an inverse relationship between the number of subsegments included in the information on the segment and a time period at which the subsegments are received.

13. The apparatus of claim 11, wherein, when the image quality is equal to an image quality included in information on a previously provided segment, the reception rate is determined as a reception rate equal to that included in the information on the previously provided segment.

14. The apparatus of claim 11, wherein the controller is configured to download the information on the segment from a server when the information on the segment is not stored in advance.

15. The apparatus of claim 11, wherein the information on the segment contains at least one piece of information among information on indexes and image qualities of subsegments included in the segment, information on a reception rate at which the information on the segment is received, information on a number of subsegments, information on a size of the segment, information on sizes of the subsegments, information on a time at which the information on the segment is received, information on a time at which each of the subsegments is received, and information on a location at which the segment exists.

16. The apparatus of claim 11, wherein the controller is configured to:
   determine that the first transmission rate is the final transmission rate, based on a result of the comparison between the amount of the information on the segment stored in the buffer and the second threshold value, when the amount of the information on the segment stored in the buffer is larger than the second threshold value; and
   determine that the first transmission rate or the second transmission rate is the final transmission rate depending on whether the information on the segment stored in the buffer contains information on all subsegments for configuring the information on the segment stored in the buffer when the amount of the information on the segment stored in the buffer is smaller than the second threshold value.

17. The apparatus of claim 16, wherein the controller is further configured to:
   determine that the second transmission rate is the final transmission rate when the information on the segment stored in the buffer does not contain the information on all the subsegments for configuring the information on the segment stored in the buffer; and
   determine that the first transmission rate or the second transmission rate is the final transmission rate depending on the first transmission rate and the second transmission rate when the information on the segment stored in the buffer contains the information on all the subsegments for configuring the information on the segment stored in the buffer.

18. The apparatus of claim 17, wherein the controller is further configured to:
   determine that the first transmission rate is the final transmission rate when the second transmission rate is larger than the first transmission rate; and
   determine that the second transmission rate is the final transmission rate when the second transmission rate is smaller than the first transmission rate.

* * * * *